US012665136B2

(12) United States Patent
Taira

(10) Patent No.: US 12,665,136 B2
(45) Date of Patent: Jun. 23, 2026

(54) ELECTRODE MATERIAL FOR ALUMINUM ELECTROLYTIC CAPACITORS AND METHOD FOR PRODUCING SAME

(71) Applicant: TOYO ALUMINIUM KABUSHIKI KAISHA, Osaka (JP)

(72) Inventor: Toshifumi Taira, Osaka (JP)

(73) Assignee: HEC TECHNOLOGY JAPAN CO., LTD., Tokyo (JP)

( * ) Notice: Subject to any disclaimer, the term of this patent is extended or adjusted under 35 U.S.C. 154(b) by 108 days.

(21) Appl. No.: 18/275,841

(22) PCT Filed: Jan. 26, 2022

(86) PCT No.: PCT/JP2022/002832
§ 371 (c)(1),
(2) Date: Aug. 4, 2023

(87) PCT Pub. No.: WO2022/196117
PCT Pub. Date: Sep. 22, 2022

(65) Prior Publication Data
US 2024/0120154 A1 Apr. 11, 2024

(30) Foreign Application Priority Data
Mar. 17, 2021 (JP) ................................. 2021-043319

(51) Int. Cl.
*H01G 9/045* (2006.01)
*B22F 1/05* (2022.01)
(Continued)

(52) U.S. Cl.
CPC .............. *H01G 9/045* (2013.01); *B22F 1/05* (2022.01); *B22F 3/10* (2013.01); *B22F 3/24* (2013.01);
(Continued)

(58) Field of Classification Search
CPC ........ H01G 9/045; H01G 9/0029; B22F 1/05; B22F 3/10; B22F 3/24; B22F 7/04;
(Continued)

(56) References Cited

U.S. PATENT DOCUMENTS

2006/0114644 A1 6/2006 Imagumbai
2007/0241077 A1* 10/2007 Kochi ....................... C23F 1/02
216/6
(Continued)

FOREIGN PATENT DOCUMENTS

JP 2008-98279 A 4/2008
JP 2011-52291 A 3/2011
(Continued)

OTHER PUBLICATIONS

International Search Report dated Apr. 5, 2022, issued in counterpart International Application No. PCT/JP2022/002832. (2 pages).
(Continued)

*Primary Examiner* — Michael P Mcfadden
(74) *Attorney, Agent, or Firm* — WHDA, LLP

(57) ABSTRACT

The present invention provides an electrode material for aluminum electrolytic capacitors, the electrode material being capable of exhibiting a high capacitance required for capacitors and having suppressed equivalent series resistance (ESR), and provides a method for producing the electrode material.

The present invention provides an electrode material for aluminum electrolytic capacitors, comprising a sintered body of an aluminum alloy powder on at least one surface of a substrate, wherein the substrate is an aluminum foil substrate or an aluminum alloy foil substrate, and the aluminum alloy powder contains Fe in an amount of 2 to 499 mass ppm.

8 Claims, 3 Drawing Sheets

(51) Int. Cl.

| | |
|---|---|
| *B22F 3/10* | (2006.01) |
| *B22F 3/24* | (2006.01) |
| *B22F 7/04* | (2006.01) |
| *C22C 21/00* | (2006.01) |
| *C23C 24/08* | (2006.01) |
| *C23C 28/00* | (2006.01) |
| *C25D 11/04* | (2006.01) |
| *H01G 9/00* | (2006.01) |

(52) U.S. Cl.
CPC .............. *B22F 7/04* (2013.01); *C22C 21/00* (2013.01); *C23C 24/087* (2013.01); *C23C 28/32* (2013.01); *C23C 28/345* (2013.01); *C25D 11/04* (2013.01); *H01G 9/0029* (2013.01); *B22F 2003/241* (2013.01); *B22F 2007/042* (2013.01); *B22F 2301/052* (2013.01); *B22F 2304/10* (2013.01); *B22F 2998/10* (2013.01); *B22F 2999/00* (2013.01)

(58) Field of Classification Search
CPC .......... B22F 2003/241; B22F 2007/042; B22F 2301/052; B22F 2304/10; B22F 2998/10; B22F 2999/00; C22C 21/00; C23C 24/087; C23C 28/32; C23C 28/345; C25D 11/04
See application file for complete search history.

(56) References Cited

U.S. PATENT DOCUMENTS

| | | | | |
|---|---|---|---|---|
| 2009/0021892 | A1* | 1/2009 | Katano | .................. H01G 9/045 |
| | | | | 205/175 |
| 2012/0094016 | A1* | 4/2012 | Taira | ..................... H01G 9/045 |
| | | | | 427/80 |
| 2014/0211375 | A1 | 7/2014 | Taira et al. | |
| 2015/0221443 | A1* | 8/2015 | Katano | ............... B05D 3/0254 |
| | | | | 427/80 |

FOREIGN PATENT DOCUMENTS

| | | | |
|---|---|---|---|
| JP | 2013-26275 | A | 2/2013 |
| JP | 2014-65940 | A | 4/2014 |
| TW | 202027109 | A | 7/2020 |
| WO | 2004/045794 | A1 | 6/2004 |

OTHER PUBLICATIONS

Office Action dated Feb. 4, 2025, issued in counterpart JP Application No. 2021-043319, with English translation. (8 pages).

* cited by examiner

ELECTRODE MATERIAL FOR ALUMINUM ELECTROLYTIC CAPACITORS AND METHOD FOR PRODUCING SAME

TECHNICAL FIELD

The present invention relates to an electrode material for aluminum electrolytic capacitors and to a method for producing the electrode material.

BACKGROUND ART

Aluminum electrolytic capacitors can provide a high capacity at a low cost and are thus widely used in the energy field. Typically, aluminum foil is used as an electrode material for aluminum electrolytic capacitors.

The surface area of aluminum foil can be increased by performing etching treatment and forming etching pits. Then, when the surface is subjected to anodization, an oxide film is formed, and the film functions as a dielectric. Accordingly, by subjecting aluminum foil to etching treatment and forming an anodic oxide film on the etched surface by applying a varying voltage corresponding to the voltage to be used, various aluminum anode electrode foils for electrolytic capacitors suitable for applications can be produced.

The etching pits obtained by etching treatment are formed into a shape corresponding to an anodization voltage. Specifically, the formation of a thick oxide film is necessary for use in medium-voltage to high-voltage capacitors. Thus, in order to prevent etching pits from being buried by such a thick oxide film, etching pits of aluminum foil for use as a medium-voltage to high-voltage anode are formed to have a tunnel-like shape mainly by direct-current etching and to have a thickness corresponding to the voltage. In contrast, fine etching pits are necessary for use in low-voltage capacitors; thus, sponge-like etching pits are formed mainly by AC etching. The surface area of a cathode foil is also increased by etching in a similar manner.

Patent Literature (PTL) 1 proposes an electrode material for aluminum electrolytic capacitors, the electrode material being composed of a sintered body of aluminum or an aluminum alloy, or both. This electrode material has a surface area greater than that of a conventional aluminum foil on which etching pits are formed, and the use of the electrode material in a capacitor can increase the capacitance.

However, in recent years, an aluminum electrolytic capacitor is required to have a larger capacitance, and an electrode material for aluminum electrolytic capacitors is required to have a larger surface area. If such requirements are addressed by increasing the thickness of the sintered layer, sintering of powder forming a sintered body and a substrate (e.g., aluminum foil), and sintering of powder particles proceed excessively, which makes the space between the powder particles narrow, or results in a pore partially isolated from the outside. Thus, there is a problem that a sufficient surface area cannot be obtained, and an electrode material for aluminum electrolytic capacitors having an excellent capacitance per volume cannot be obtained.

In recent years, electrode materials for aluminum electrolytic capacitors are required to have a low equivalent series resistance (ESR). When the ESR of the electrode material for aluminum electrolytic capacitors is high, the charging and discharging efficiency of the produced capacitor is lowered, and there is a problem that products with high added value cannot be produced.

CITATION LIST

Patent Literature

PTL 1: JP2008-98279A

SUMMARY OF INVENTION

Technical Problem

An object of the present invention is to provide an electrode material for aluminum electrolytic capacitors, the electrode material being capable of exhibiting a high capacitance required for capacitors and having suppressed equivalent series resistance (ESR), and to provide a method for producing the electrode material.

Solution to Problem

As a result of extensive research, the present inventors focused on elements contained in an aluminum alloy powder that forms a sintered body, particularly iron (Fe), and found that by setting the Fe content to a specific range, it is possible to control the sintering speed of sintering between the powder forming a sintered body and a substrate, and the sintering speed of sintering between powder particles, to increase the surface area per volume of an electrode material for aluminum electrolytic capacitors, and to improve the capacitance for aluminum electrolytic capacitors. Additionally, they found that the equivalent series resistance (ESR) can be suppressed by taking the above structure. The present inventors have found that by suppressing the ESR, the charging and discharging efficiency of a capacitor produced using the electrode material for aluminum electrolytic capacitors is improved, and a product with high added value can be produced. The present inventors thus accomplished the present invention.

More specifically, the present invention relates to the following electrode material for aluminum electrolytic capacitors and production method therefor.

1. An electrode material for aluminum electrolytic capacitors, comprising a sintered body of an aluminum alloy powder on at least one surface of a substrate, the substrate being an aluminum foil substrate or an aluminum alloy foil substrate, and the aluminum alloy powder containing Fe in an amount of 2 to 499 mass ppm.

2. The electrode material for aluminum electrolytic capacitors according to Item 1, wherein the aluminum alloy powder contains Fe in an amount of 2 to 400 mass ppm, and the remainder comprises Al and an unavoidable impurity.

3. The electrode material for aluminum electrolytic capacitors according to Item 1 or 2, wherein the aluminum alloy powder has an average particle diameter $D_{50}$ of 1.5 $\mu$m or more and 15 $\mu$m or less.

4. The electrode material for aluminum electrolytic capacitors according to any one of Items 1 to 3, wherein the substrate is an aluminum foil substrate having an Al purity of 99.99 mass % or more, and has a thickness of 10 $\mu$m or more and 80 $\mu$m or less.

5. The electrode material for aluminum electrolytic capacitors according to any one of Items 1 to 4, wherein the sintered body is formed on both surfaces of the substrate, and has a total thickness of 50 μm or more and 2000 μm or less.

6. A method for producing an electrode material for aluminum electrolytic capacitors, comprising
    (1) step 1 of forming a film of a paste composition containing an aluminum alloy powder on at least one surface of a substrate, and
    (2) step 2 of sintering the film at a temperature of 560° C. or more and 660° C. or less, wherein
the substrate is an aluminum foil substrate or an aluminum alloy foil substrate, and
the aluminum alloy powder contains Fe in an amount of 2 to 499 mass ppm.

7. The production method according to Item 6, wherein the aluminum alloy powder has an average particle diameter $D_{50}$ of 1.5 μm or more and 15 μm or less.

8. The production method according to Item 6 or 7, further comprising an anodization step after step 2, wherein the voltage in the anodization step is 250 V or more and 800 V or less.

Advantageous Effects of Invention

The electrode material for aluminum electrolytic capacitors of the present invention is capable of exhibiting a high capacitance required for capacitors and has suppressed equivalent series resistance (ESR).

DESCRIPTION OF EMBODIMENTS

Figure 1:
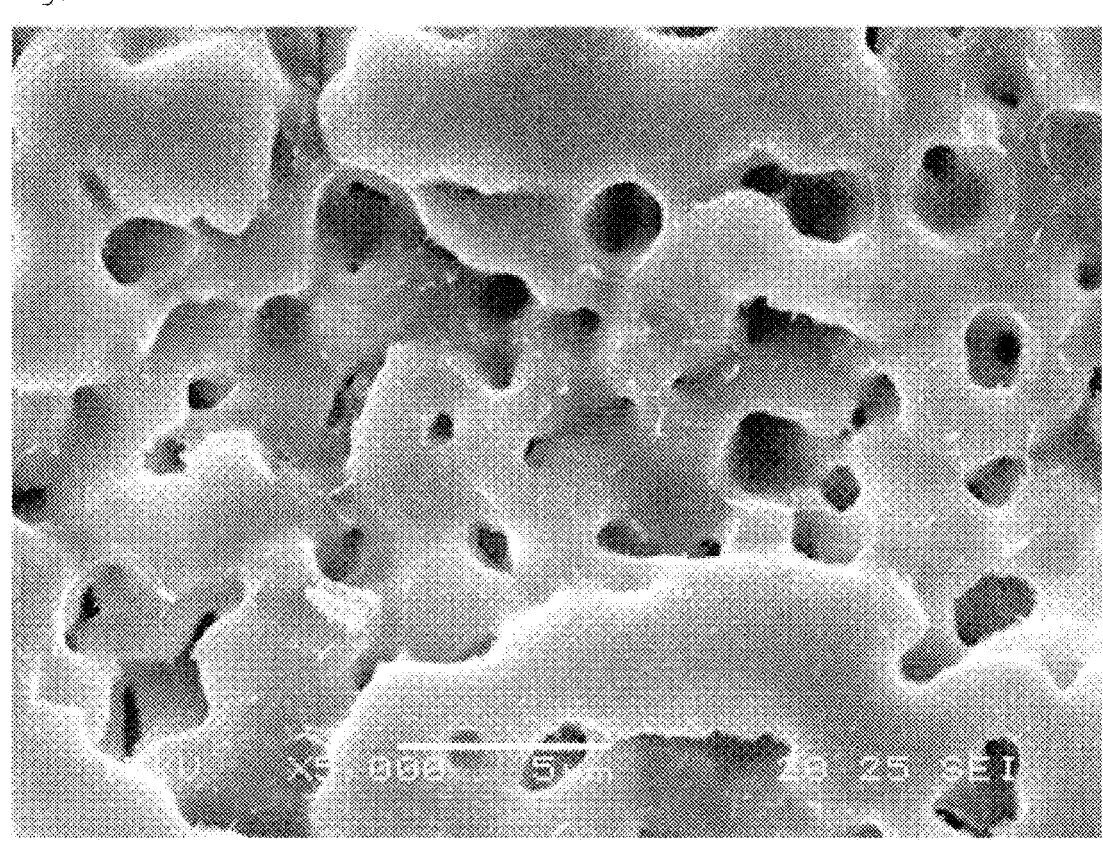
FIG. 1 is an image obtained by observing the back surface of the electrode material produced in Comparative Example 1-2 and photographing the back surface with a scanning electron microscope (SEM).

1. Electrode Material for Aluminum Electrolytic Capacitors

The electrode material for aluminum electrolytic capacitors of the present invention is an electrode material for aluminum electrolytic capacitors comprising a sintered body of an aluminum alloy powder on at least one surface of a substrate, wherein the substrate is an aluminum foil substrate or an aluminum alloy foil substrate, and the aluminum alloy powder contains Fe in an amount of 2 to 499 mass ppm.

In the electrode material for aluminum electrolytic capacitors of the present invention (hereinafter, simply referred to as an "electrode material"), the substrate is an aluminum foil substrate or an aluminum alloy foil substrate, and an aluminum alloy powder (hereinafter, simply referred to as "powder") is an alloy powder containing Fe in an amount of 2 to 499 mass ppm, and thus, it is possible to control the sintering speed of sintering between the powder forming a sintered body and a substrate, and the sintering speed of sintering between powder particles, to increase the surface area per volume of the electrode material for aluminum electrolytic capacitors. Thus, it is possible to improve the capacitance of the aluminum electrolytic capacitor. Additionally, with the above structure, equivalent series resistance (hereinafter, also simply referred to as "ESR") can be suppressed, and the charging and discharging efficiency of the capacitor produced using the electrode material for aluminum electrolytic capacitors is improved, and a product with high added value can be produced.

The electrode material of the present invention is described in detail below.

Sintered Body

The electrode material of the present invention comprises a sintered body of an aluminum alloy powder on at least one surface of a substrate.

The sintered body may be formed on at least one surface of the substrate, and may be formed on both surfaces. From the viewpoint of further improving the capacitance of the electrode material, the sintered body is preferably formed on both surfaces.

The sintered body is preferably a porous sintered body having a three-dimensional network structure in which the powder particles are sintered and bonded to each other while maintaining voids. By having such a structure, the surface area of the sintered body is increased, making it possible to obtain an electrode material that is capable of producing an aluminum electrolytic capacitor (also simply referred to below as a "capacitor") exhibiting a high capacitance.

The aluminum alloy powder contains Fe in an amount of 2 to 499 mass ppm. When the aluminum alloy powder is out of the above range, the sintering speed of sintering of the powder forming the sintered body and a substrate, and the sintering speed of sintering of powder particles cannot be controlled, and excessive necking occurs, which reduces the number of pores communicating from the surface of the sintered body on the substrate side to the surface opposite to the substrate side, and the number of pores isolated in the sintered body increases, thus failing to increase the surface area after sintering. The content of Fe is preferably low as long as it is 2 mass ppm or more; however, it may be 5 mass ppm or more or 8 mass ppm or more. The content of Fe is preferably 400 mass ppm or less, and more preferably 190 mass ppm or less. The content of Fe is preferably 2 to 400 mass ppm. When the content of Fe is within the above range, excessive sintering is further suppressed, the capacitance in the capacitor electrode is further increased, and the ESR is further reduced.

The aluminum alloy powder is preferably an aluminum alloy powder containing Fe in an amount of 2 to 400 mass ppm, and the remainder comprises Al and an unavoidable impurity. The aluminum content and the unavoidable impurity will be described below.

The aluminum content of the aluminum alloy powder is preferably 99.80 mass; or more, more preferably 99.85 mass % or more, and still more preferably 99.99 mass % or more.

The aluminum alloy powder may contain, as an avoidable impurity, one or more elements selected from silicon (Si), copper (Cu), manganese (Mn), magnesium (Mg), chromium (Cr), zinc (Zn), titanium (Ti), vanadium (V), gallium (Ga), nickel (Ni), boron (B), zirconium (Zr), and the like. The content of these elements in the aluminum alloy that forms the aluminum alloy powder is preferably 100 mass ppm or less, and more preferably 50 mass ppm or less. When the content of the elements in the aluminum alloy powder is within the above range, the capacitance of the electrode material for aluminum electrolytic capacitors is further improved.

The aluminum alloy powders may be used alone or as a mixture of two or more.

The average particle diameter $D_{50}$ of the aluminum alloy powder is preferably 1.5 μM or more, and more preferably 2.0 μm or more. The average particle diameter $D_{50}$ is preferably 15 μm or less, and more preferably 5 μm or less. When the average particle diameter is in the above range, the capacitance of the electrode material is further improved.

In the present specification, the average particle diameter $D_{50}$ of the aluminum alloy powder in the sintered body can be measured by observing the cross section of the sintered body with a scanning electron microscope. Specifically, when the powder is sintered to form a sintered body, some of the powder after sintering is in a molten state or a state in which powder particles are connected; however, some having a substantially circular shape can be approximately regarded as a particle. Therefore, in the observation of the cross section, the maximum diameter (long diameter) of each of the particles having a substantially circular shape is defined as the particle diameter of its particle, the particle diameters of any 50 particles are measured, and the arithmetic average is defined as the average particle diameter $D_V$, of the powder after sintering. The particle diameter of the powder obtained by this method hardly changes as compared with the particle diameter before sintering.

The average particle diameter $D_{50}$ of the powder in the sintered body measured by the measurement method described above is almost unchanged from and is substantially the same as the average particle diameter $D_{50}$ of the powder before sintering. Thus, the measurement value of the average particle diameter $D_{50}$ of the powder before sintering can be defined as the average particle diameter $D_{51}$ of the powder in the sintered body. In this specification, the average particle diameter $D_{50}$ of the powder before sintering can be determined by measuring the particle size distribution on a volume basis by a laser diffraction/scattering method by a wet method using a Microtrac MT3300 EXII (produced by Microtrac Corp.) and calculating the $D_{50}$, value.

The total thickness of the sintered body is preferably 50 μm or more and 2000 μm or less. If the total thickness of the sintered body is 50 μm or more, the capacitance of the electrode material is further increased. When the total thickness of the sintered body is 2000 μm, the formation of the sintered body is difficult. The total thickness of the sintered body is more preferably 70 μm or more, even more preferably 100 μm or more, and particularly preferably 300 μm or more. The total thickness of the sintered body is more preferably 900 μm or less, even more preferably 500 μm or less, and particularly preferably 300 μm or less. In this specification, when the electrode material of the present invention has the sintered body on both surfaces of the aluminum foil substrate, the total thickness of the sintered body is the sum of the thicknesses of the sintered bodies formed on both surfaces. When the electrode material of the present invention has the sintered body on only one surface of the aluminum foil substrate, the total thickness is the thickness of the sintered body on one surface.
Substrate The electrode material of the present invention comprises a substrate. In the present invention, the substrate is an aluminum foil substrate or an aluminum alloy foil substrate.

The aluminum foil used for forming the aluminum foil substrate is preferably an aluminum foil made of pure aluminum.

The aluminum content in the aluminum foil made of pure aluminum is preferably 99.80 mass % or more, more preferably 99.85 mass? or more, and still more preferably 99.99 mass % or more.

The aluminum alloy used for the aluminum alloy foil for forming the aluminum alloy foil substrate may be an aluminum alloy obtained by adding to aluminum at least one metal element selected from the group consisting of silicon (Si), iron (Fe), copper (Cu), manganese (Mn), magnesium (Mg), chromium (Cr), zinc (Zn), titanium (Ti), vanadium (V), gallium (Ga), nickel (Ni), and boron (B) within required ranges, or may be an aluminum alloy containing at least one element above as an unavoidable impurity. The content of these elements in the aluminum alloy is preferably 100 mass ppm or less, and more preferably 50 mass ppm or less. When the content of the elements in the aluminum alloy is within the above range, the capacitance of the electrode material for aluminum electrolytic capacitors is further improved.

The thickness of the substrate is preferably 10 μm or more, more preferably 15 μm or more, and still more preferably 20 μm or more, from the viewpoint of further improving the strength of the electrode material. The thickness of the aluminum foil substrate is preferably 80 μm or less, more preferably 60 μm or less, and still more preferably 40 μm or less, from the viewpoint of further improving the capacity per volume for an electrode material for capacitors.
Anodic Oxide Film The electrode material of the present invention may further comprise an anodic oxide film on the surface of the sintered body. The anodic oxide film present on the surface of the sintered body functions as a dielectric, whereby the electrode material of the present invention can be usefully used as an electrode material for aluminum electrolytic capacitors.

The anodic oxide film can be produced by anodizing the surface of the sintered body. The anodic oxide film functions as a dielectric film.

The thickness of the anodic oxide film is preferably 0.2 μm or more and 1.1 μm or less, and more preferably 0.3 μm or more and 1.05 μm or less.

The film withstand voltage of the anodic oxide film is preferably 250 V or more and 800 V or less, and more preferably 300 V or more and 800 V or less. The film withstand voltage of the anodic oxide film can be measured by a measurement method in accordance with RC-2364A established by the Electronic Industries Association of Japan.

2. Method for Producing an Electrode Material for Aluminum Electrolytic Capacitors The method of producing an electrode material for aluminum electrolytic capacitors of the present invention comprises (1) step 1 of forming a film of a paste composition containing an aluminum alloy powder on at least one surface of a substrate, and (2) step 2 of sintering the film at a temperature of 560° C. or more and 660° C. or less, wherein the substrate is an aluminum foil substrate or an aluminum alloy foil substrate, and the aluminum alloy powder contains Fe in an amount of 2 to 499 mass ppm. The details are described below.
Step 1

Step 1 is (1) a step of forming a film of a paste composition containing an aluminum alloy powder on at least one surface of a substrate.

The aluminum alloy powder used as a raw material for producing an electrode material contains Fe in an amount of 2 to 499 mass ppm. When the aluminum alloy powder is out of the above range, the sintering speed of sintering of the powder forming a sintered body and a substrate, and the sintering speed of sintering of powder particles cannot be controlled, and excessive necking occurs, which reduces the number of pores communicating from the surface of the sintered body on the substrate side to the surface opposite to the substrate side, and the number of pores isolated in the sintered body increases, thus failing to increase the surface area after sintering. The content of Fe is preferably low as long as it is 2 mass ppm or more; however, it may be 5 mass ppm or more, or 8 mass ppm or more. The content of Fe is preferably 400 mass ppm or less, and more preferably 190 mass ppm or less. When the content of Fe is within the above range, excessive sintering is further suppressed, the capacitance in the capacitor electrode is further increased, and the ESR is further reduced.

The aluminum content and unavoidable impurity will be described below.

The aluminum content of the aluminum alloy powder is preferably 99.80 mass; or more, more preferably 99.85 mass % or more, and still more preferably 99.99 mass % or more.

The aluminum alloy powder may contain, as an avoidable impurity, one or more elements selected from silicon (Si), copper (Cu), manganese (Mn), magnesium (Mg), chromium (Cr), zinc (Zn), titanium (Ti), vanadium (V), gallium (Ga), nickel (Ni), boron (B), zirconium (Zr), and the like. The content of these elements in the aluminum alloy forming the aluminum alloy powder is preferably 100 mass ppm or less, and more preferably 50 mass ppm or less. When the content of the element in the aluminum alloy powder is within the above range, the capacitance of the electrode material for aluminum electrolytic capacitors is further improved.

The aluminum alloy powders can be used alone or as a mixture of two or more aluminum alloy powders having different compositions and average particle diameters.

These powders may be used alone or as a mixture of two or more powders, such as a mixture of an aluminum alloy powder and a compound particle or a resin particle.

The average particle diameter $D_{50}$ of the aluminum alloy powder is preferably 1.5 μm or more and more preferably 2.0 μm or more. The average particle diameter $D_{50}$ is preferably 15 μm or less, and more preferably 5 μm or less. When the average particle diameter is in the above range, the capacitance of the electrode material is further improved.

The average particle diameter $D_{50}$ of the aluminum alloy powder can be determined by measuring the particle size distribution on a volume basis by a laser diffraction/scattering method by a wet method using a MT3300 EXII (produced by Microtrac Corp.) and calculating the $D_{50}$ value.

The shape of the aluminum alloy powder is not particularly limited; a spherical, amorphous, scaly, or fibrous shape is suitably used. For industrial production, a powder of spherical particles is particularly preferable.

The aluminum alloy powder may be produced by a known method. Examples of the method include an atomizing method, a melt-spinning process, a rotating disk method, a rotating electrode process, a rapid solidification process, etc. For industrial production, an atomizing method, in particular, a gas atomizing method, is preferable. More specifically, a powder obtained by atomizing aluminum molten metal whose Fe content is adjusted is preferably used.

The paste composition may contain a resin binder. The resin binder may be widely selected from known resin binders. Examples of suitable resin binders include carboxy-modified polyolefin resins, vinyl acetate resins, vinyl chloride resins, vinyl chloride-vinyl acetate copolymers, vinyl alcohol resins, butyral resins, vinyl fluoride resins, acrylic resins, polyester resins, urethane resins, epoxy resins, urea resins, phenol resins, acrylonitrile resins, cellulose resins, paraffin wax, polyethylene wax, and other synthetic resins;

waxes, tar, glue, sumac, pine resin, beeswax, and other natural resins; and waxes. These resin binders include those that volatilize by heating, and those that remain as a remainder with aluminum powder due to pyrolysis by heating, depending on the molecular weight, type of resin, etc. The resin binders may be used properly according to the desired electrical characteristics, such as capacitance.

The content of the resin binder in the paste composition is preferably 0.5 mass % or more and 10 mass % or less, and more preferably 0.75 mass % or more and 5 mass % or less, per 100 mass % of the paste composition. When the amount of the resin binder in the paste composition is 0.5 mass % or more, the adhesion strength between the substrate and the unsintered laminate can be improved. On the other hand, when the amount of the resin binder is 10 mass % or less, degreasing is easily performed in the sintering step and the degreasing step, and defects due to the remaining resin binder can be reduced.

Additionally, the paste composition may optionally further contain a solvent, a sintering aid, a surfactant, etc. that are known or commercially available products, whereby a film can be formed efficiently.

The solvent may be widely selected from known solvents. Examples of usable solvents include water and organic solvents, such as toluene, alcohols, ketones, and esters.

The sintering aid may also be widely selected from known sintering aids. Examples of usable sintering aids include aluminum fluoride, potassium fluoride, and the like.

The surfactant may also be widely selected from known surfactants. Examples of usable surfactants include betaine-based surfactants, sulfobetaine-based surfactants, alkyl-betaine-based surfactants, and the like.

When the paste composition is adhered to one surface or both surfaces of the substrate to form a film of the paste composition, the total thickness of the film is preferably 50 μm or more and 2000 μM or less. The total thickness of the film is more preferably 70 μm or more, even more preferably 100 μm or more, and particularly preferably 300 μm or more. The total thickness of the film is more preferably 900 μm or less, even more preferably 500 μm or less, and particularly preferably 300 μm or less. In this specification, when the film is formed on both surfaces of the substrate in step 1, the total thickness of the film is the sum of the thicknesses of the films formed on both surfaces of the substrate. When the film is formed on only one surface of the substrate in step 1, the total thickness is the thickness of the film on one surface.

The method of forming a film on the substrate is not particularly limited. For example, a film can be formed by a method of applying the paste composition by die coating, gravure coating, direct coating, rolling, brushing, spraying, dipping, or the like; or by a known printing method, such as silk-screen printing.

As the substrate, the same substrate as the aluminum foil substrate or the aluminum alloy foil substrate described for the electrode material for aluminum electrolytic capacitors can be used☐

It is also preferable to dry the film adhered to the substrate together with the substrate at a temperature in the range of 20° C. or more and 300° C. or less for 1 minute or more and 30 minutes or less as necessary.

Step 2

Step 2 is (2) a step of sintering the film at a temperature of 560° C. or more and 660° C. or less.

In step 2, the powder in the film is sintered to form a sintered body on the substrate. The sintering temperature is 560° C. or more and 660° C. or less. If the sintering temperature is less than 560° C., sintering does not proceed, and a desired capacitance cannot be obtained. If the sintering temperature exceeds 660° C., the powder melts and sufficient capacity cannot be obtained when the resulting product is used as an electrode material for electrolytic capacitors. The sintering temperature is preferably 570° C. or more and less than 650° C., and more preferably 580° C. or more and less than 620° C.

Although the sintering time is affected by the sintering temperature etc., the sintering time can usually be appropriately determined within the range of about 5 to 24 hours. The sintering atmosphere is not particularly limited. Examples include a vacuum atmosphere, an inert gas atmosphere, an oxidizing gas atmosphere (air), a reducing atmosphere, and the like. In particular, a vacuum atmosphere or a reducing atmosphere is preferable. Further, the pressure conditions may normal pressure, reduced pressure, or increased pressure.

Degreasing Step

In the production method of the present invention, before step 2, a degreasing step is preferably performed for the purpose of vaporizing the resin binder in the film. Examples of the degreasing step include a step of performing heating at 200° C. or more and 500° C. or less for 1 hour or more and 20 hours or less in an oxidizing gas atmosphere (air). When the lower limit of the heating temperature or the lower limit of the heating time is within the above ranges, the resin binder in the film is further vaporized, and the remainder of the resin binder in the film can be suppressed. Further, when the upper limit of the heating temperature or the upper limit of the heating time is within the above ranges, excessive progress of sintering of the aluminum alloy powder in the film can be suppressed, and further sufficient capacity is obtained when the resulting product is used as an electrode material for electrolytic capacitors.

Anodization Step

The production method of the present invention may further comprise an anodization step as step 3 after step 2. In the anodization step, an anodic oxide film is formed on the surface of the sintered body, and the anodic oxide film functions as a dielectric, whereby the electrode material can be usefully used as an electrode material for aluminum electrolytic capacitors.

The anodization conditions are not particularly limited. The anodization may be performed with respect to an electrode material that has undergone step 1 and step 2 usually by applying a current of 10 mA/cm² or more and 400 mA/cm² or less for 5 minutes or more in an aqueous boric acid solution or an aqueous ammonium adipate solution at a temperature of 30° C. or more and 100° C. or less with a concentration of 0.01 mol or more and 5 mol or less. The anodization as described above is usually performed while feeding an electrode material using one or more rolls on a production line.

In the anodization step, the voltage is preferably selected from 250 V or more to 800 V or less. The voltage is preferably a processing voltage corresponding to the operating voltage of the aluminum electrolytic capacitor obtained by using the resulting product as an aluminum electrolytic capacitor electrode. Since the aluminum electrolytic capacitor produced using the electrode material for aluminum electrolytic capacitors of the present invention particularly exhibits excellent capacitance at high voltage, the voltage in the anodization step is more preferably 400 V or higher, and even more preferably 550 V or higher.

According to the method for producing the electrode material of the present invention, an excellent electrode material can be obtained without performing etching treatment. This method, which does not include an etching step, eliminates the need for a treatment of hydrochloric acid etc. for use in etching, thus achieving a further reduction in environmental and economic burden.

Method for Producing an Electrolytic Capacitor

An electrolytic capacitor can be produced using the electrode material of the present invention. Examples of the method for producing an electrolytic capacitor include the following method. Specifically, the electrode material of the present invention is used as an anode foil, and the anode foil and a cathode foil are laminated with a separator between them, and the laminate is wound to form a capacitor element. The capacitor element is impregnated with an electrolyte, the capacitor element containing the electrolyte is housed in an outer case, and the outer case is sealed with a sealing material.

Although embodiments of the present invention are described above, the present invention is not limited to these embodiments. It is evident to those skilled in the art that various modifications can be made without departing from the spirit and principal concepts of the invention.

EXAMPLES

The present invention is described in more detail below with reference to Examples and Comparative Examples. However, the present invention is not limited to the Examples.

Example 1 and Comparative Example 1

Step 1

Aluminum alloy powders (JIS A 1080, produced by Toyo Aluminum Co., Ltd.) having a different Fe content and an average particle diameter ($D_{50}$) of 3 μm as shown in Table 1 were prepared for use in Comparative Example 1-1, Comparative Example 1-2, and Examples 1-1 to 1-5. The average particle diameter $D_{50}$ of the aluminum alloy powder was calculated by measuring the particle size distribution on a volume basis by a laser diffraction/scattering method by a wet method using a Microtrac MT 3300 EXII (produced by Microtrac Corp.)

Subsequently, a resin binder solution containing 5 mass % of ethyl cellulose binder resin was prepared by adding ethyl cellulose binder resin to butyl acetate as a solvent. To 60 parts by mass of the resin binder solution, 100 parts by mass of aluminum alloy powder was added, and the mixture was kneaded to prepare a paste composition. The obtained paste composition was applied to one surface of a 30-μm-thick aluminum foil (aluminum: 99.99 wt %) using a comma direct coater so that the paste composition was adhered (thickness: 50 μm) to one surface of the aluminum foil, followed by drying, to form a film. The paste composition was similarly applied to the opposite side of the aluminum foil, adhered to one surface of the aluminum foil with a thickness of 50 μm, and dried to form a film. Thus, films were formed on the both surfaces of the aluminum foil. Subsequently, drying was performed at 100° C. for 1.5 minutes to obtain an unsintered laminate.

Step (2)

After the unsintered laminate obtained in step 1 was heated at 300° C. for 2 hours in an air atmosphere, the laminate was heated at 635° C. for 7 hours under argon gas atmosphere to sinter the composition to form a sintered body on the aluminum foil substrate, thus producing an electrode material. The average thickness of the sintered body after sintering was measured with a micrometer, and the thickness was 50 μm per side.

The average particle diameter $D_{50}$ of the powder in the sintered body hardly changes from the average particle diameter $D_{50}$ of the powder before sintering and is substantially the same. The average particle diameter $D_{50}$ of the aluminum powder before sintering was set to the average particle diameter $D_{50}$ of the aluminum powder in the sintered body.

Step 3

The produced electrode material was further subjected to anodization. The anodization was performed at a chemical conversion voltage of 250 to 800 V in accordance with RC-2364A established by the Electronic Industries Association of Japan.

Examples 2 to 7 and Comparative Examples 2 to 7

The powder was changed to the powders shown in the table below, and the thickness of the sintered body was changed to the thicknesses shown in Table 1. In Example 7 and Comparative Example 7, a sintered body was formed on one surface of the substrate. Electrode materials were produced and anodization was performed in the same manner as in Example 1 and Comparative Example 1 except for the above.

The following evaluation was performed using the anodized electrode materials of Examples 1 to 7 and Comparative Examples 1 to 7 produced as described above.

Capacitance Evaluation Test

In accordance with RC-2364A established by the Electronic Industries Association of Japan, a capacitance evaluation test was conducted with respect to the electrode materials of the Examples and Comparative Examples. The formation voltage was 250 V. 400 V, 550 V, and 800 V.

ESR Measurement

The electrode materials of the Examples and Comparative Examples were cut into a size of 50 mm×20 mm, immersed in an ammonium borate aqueous solution (80 g of ammonium borate and 1000 g of pure water) having a liquid temperature of 20° C. together with a counter electrode (produced by SUS304), and measured using an LCZ meter (2321 LCZ, produced by NF electronic instruments, Inc.). The measurement frequency includes 2 points, 120 Hz and 100 kHz, and the initial value of each frequency was used as the ESR.

The results are shown in Tables 1 to 7.

TABLE 1

| | Fe content of powder (mass ppm) | Average particle diameter $D_{50}$ (μm) | Fe content of substrate (mass ppm) | Laminate thickness (μm) (sintered body/substrate/ sintered body) | Electrostatic capacity (μF/cm²) | | | | ESR (/10 cm²) | |
|---|---|---|---|---|---|---|---|---|---|---|
| | | | | | 250 V | 400 V | 550 V | 800 V | 120 Hz | 100 kHz |
| Comparative Example 1-1 | 750 | 3 | 16 | 50/30/50 | 2.72 | 1.51 | 0.84 | 0.58 | 45.0 | 13.4 |
| Comparative Example 1-2 | 500 | 3 | 16 | 50/30/50 | 2.75 | 1.54 | 0.87 | 0.58 | 38.5 | 12.0 |
| Example 1-1 | 499 | 3 | 16 | 50/30/50 | 3.30 | 1.86 | 1.06 | 0.72 | 15.0 | 4.5 |
| Example 1-2 | 190 | 3 | 16 | 50/30/50 | 3.32 | 1.88 | 1.06 | 0.73 | 15.2 | 4.5 |
| Example 1-3 | 100 | 3 | 16 | 50/30/50 | 3.31 | 1.89 | 1.07 | 0.73 | 15.5 | 4.2 |
| Example 1-4 | 10 | 3 | 16 | 50/30/50 | 3.32 | 1.89 | 1.08 | 0.74 | 15.0 | 4.3 |
| Example 1-5 | 2 | 3 | 16 | 50/30/50 | 3.31 | 1.90 | 1.08 | 0.74 | 15.1 | 4.4 |

TABLE 2

| | Fe content of powder (mass ppm) | Average particle diameter $D_{50}$ (μm) | Fe content of substrate (mass ppm) | Laminate thickness (μm) (sintered body/substrate/ sintered body) | Electrostatic capacity (μF/cm²) | | | | ESR (Ω/10 cm²) | |
|---|---|---|---|---|---|---|---|---|---|---|
| | | | | | 250 V | 400 V | 550 V | 800 V | 120 Hz | 100 kHz |
| Comparative Example 2-1 | 750 | 5 | 16 | 50/30/50 | 2.02 | 1.17 | 0.75 | 0.51 | 44.4 | 13.2 |
| Comparative Example 2-2 | 500 | 5 | 16 | 50/30/50 | 2.03 | 1.19 | 0.78 | 0.52 | 37.5 | 11.7 |
| Example 2-1 | 499 | 5 | 16 | 50/30/50 | 2.43 | 1.45 | 0.94 | 0.63 | 14.6 | 4.3 |
| Example 2-2 | 190 | 5 | 16 | 50/30/50 | 2.45 | 1.45 | 0.94 | 0.64 | 14.5 | 4.3 |
| Example 2-3 | 100 | 5 | 16 | 50/30/50 | 2.46 | 1.46 | 0.97 | 0.65 | 15.0 | 4.2 |
| Example 2-4 | 10 | 5 | 16 | 50/30/50 | 2.48 | 1.47 | 0.97 | 0.65 | 14.8 | 4.1 |
| Example 2-5 | 2 | 5 | 16 | 50/30/50 | 2.47 | 1.47 | 0.97 | 0.66 | 14.7 | 4.4 |

TABLE 3

| | Fe content of powder (mass ppm) | Average particle diameter $D_{50}$ (μm) | Fe content of substrate (mass ppm) | Laminate thickness (μm) (sintered body/substrate/ sintered body) | Electrostatic capacity (μF/cm²) | | | | ESR (Ω/10 cm²) | |
|---|---|---|---|---|---|---|---|---|---|---|
| | | | | | 250 V | 400 V | 550 V | 800 V | 120 Hz | 100 kHz |
| Comparative Example 3-1 | 750 | 15 | 16 | 50/30/50 | 0.82 | 0.53 | 0.37 | 0.23 | 40.7 | 12.3 |
| Comparative Example 3-2 | 500 | 15 | 16 | 50/30/50 | 0.82 | 0.53 | 0.37 | 0.24 | 32.2 | 10.1 |
| Example 3-1 | 499 | 15 | 16 | 50/30/50 | 0.99 | 0.64 | 0.46 | 0.31 | 12.0 | 3.9 |
| Example 3-2 | 190 | 15 | 16 | 50/30/50 | 1.00 | 0.64 | 0.46 | 0.31 | 11.9 | 4.0 |
| Example 3-3 | 100 | 15 | 16 | 50/30/50 | 1.03 | 0.66 | 0.47 | 0.32 | 13.0 | 4.0 |
| Example 3-4 | 10 | 15 | 16 | 50/30/50 | 1.03 | 0.66 | 0.48 | 0.33 | 12.8 | 4.1 |
| Example 3-5 | 2 | 15 | 16 | 50/30/50 | 1.04 | 0.66 | 0.48 | 0.33 | 12.7 | 3.9 |

TABLE 4

| | Fe content of powder (mass ppm) | Average particle diameter $D_{50}$ (μm) | Fe content of substrate (mass ppm) | Laminate thickness (μm) (sintered body/substrate/ sintered body) | Electrostatic capacity (μF/cm²) | | | | ESR (Ω/10 cm²) | |
|---|---|---|---|---|---|---|---|---|---|---|
| | | | | | 250 V | 400 V | 550 V | 800 V | 120 Hz | 100 kHz |
| Comparative Example 4-1 | 750 | 1.5 | 16 | 50/30/50 | 3.66 | 1.65 | 0.53 | 0.35 | 45.5 | 15.0 |
| Comparative Example 4-2 | 500 | 1.5 | 16 | 50/30/50 | 3.67 | 1.70 | 0.55 | 0.36 | 43.2 | 14.7 |
| Example 4-1 | 499 | 1.5 | 16 | 50/30/50 | 4.43 | 2.10 | 0.68 | 0.45 | 18.9 | 4.9 |
| Example 4-2 | 190 | 1.5 | 16 | 50/30/50 | 4.45 | 2.12 | 0.68 | 0.46 | 18.9 | 5.1 |
| Example 4-3 | 100 | 1.5 | 16 | 50/30/50 | 4.46 | 2.12 | 0.69 | 0.47 | 19.2 | 5.1 |
| Example 4-4 | 10 | 1.5 | 16 | 50/30/50 | 4.49 | 2.12 | 0.69 | 0.48 | 18.8 | 5.0 |
| Example 4-5 | 2 | 1.5 | 16 | 50/30/50 | 4.49 | 2.13 | 0.69 | 0.48 | 19.3 | 4.9 |

TABLE 5

| | Fe content of powder (mass ppm) | Average particle diameter $D_{50}$ (μm) | Fe content of substrate (mass ppm) | Laminate thickness (μm) (sintered body/substrate/ sintered body) | Electrostatic capacity (μF/cm²) | | | | ESR (Ω/10 cm²) | |
|---|---|---|---|---|---|---|---|---|---|---|
| | | | | | 250 V | 400 V | 550 V | 800 V | 120 Hz | 100 kHz |
| Comparative Example 5-1 | 750 | 3 | 16 | 25/30/25 | 1.33 | 0.76 | 0.43 | 0.29 | 50.1 | 13.9 |
| Comparative Example 5-2 | 500 | 3 | 16 | 25/30/25 | 1.38 | 0.76 | 0.44 | 0.29 | 43.4 | 12.8 |
| Example 5-1 | 499 | 3 | 16 | 25/30/25 | 1.66 | 0.93 | 0.54 | 0.37 | 20.0 | 4.8 |
| Example 5-2 | 190 | 3 | 16 | 25/30/25 | 1.67 | 0.93 | 0.55 | 0.38 | 19.7 | 4.7 |
| Example 5-3 | 100 | 3 | 16 | 25/30/25 | 1.66 | 0.95 | 0.57 | 0.38 | 19.5 | 4.7 |
| Example 5-4 | 10 | 3 | 16 | 25/30/25 | 1.67 | 0.96 | 0.57 | 0.39 | 19.9 | 4.6 |
| Example 5-5 | 2 | 3 | 16 | 25/30/25 | 1.67 | 0.96 | 0.57 | 0.39 | 20.0 | 4.7 |

TABLE 6

| | Fe content of powder | Average particle diameter $D_{50}$ | Fe content of substrate | Laminate thickness (μm) (sintered body/substrate/ | Electrostatic capacity (μF/cm²) | | | | ESR (Ω/10 cm²) | |
|---|---|---|---|---|---|---|---|---|---|---|
| | (mass ppm) | (μm) | (mass ppm) | sintered body) | 250 V | 400 V | 550 V | 800 V | 120 Hz | 100 kHz |
| Comparative Example 6-1 | 750 | 3 | 16 | 1000/30/1000 | 55.00 | 30.40 | 17.10 | 11.80 | 42.1 | 12.8 |
| Comparative Example 6-2 | 500 | 3 | 16 | 1000/30/1000 | 55.40 | 30.50 | 17.40 | 11.90 | 35.2 | 11.5 |
| Example 6-1 | 499 | 3 | 16 | 1000/30/1000 | 66.40 | 37.30 | 21.30 | 14.50 | 12.6 | 4.0 |
| Example 6-2 | 190 | 3 | 16 | 1000/30/1000 | 66.70 | 37.30 | 21.40 | 14.60 | 12.7 | 4.0 |
| Example 6-3 | 100 | 3 | 16 | 1000/30/1000 | 67.00 | 37.60 | 21.60 | 14.60 | 12.4 | 3.9 |
| Example 6-4 | 10 | 3 | 16 | 1000/30/1000 | 67.10 | 37.70 | 21.70 | 14.70 | 12.8 | 4.1 |
| Example 6-5 | 2 | 3 | 16 | 1000/30/1000 | 67.10 | 37.90 | 21.70 | 14.70 | 12.7 | 4.1 |

TABLE 7

| | Fe content of powder | Average particle diameter $D_{50}$ | Fe content of substrate | Laminate thickness (μm) (sintered | Electrostatic capacity (μF/cm²) | | | | ESR (Ω/10 cm²) | |
|---|---|---|---|---|---|---|---|---|---|---|
| | (mass ppm) | (μm) | (mass ppm) | body/substrate) | 250 V | 400 V | 550 V | 800 V | 120 Hz | 100 kHz |
| Comparative Example 7-1 | 750 | 3 | 16 | 100/30 | 2.72 | 1.51 | 0.84 | 0.56 | 45.6 | 13.6 |
| Comparative Example 7-2 | 500 | 3 | 16 | 100/30 | 2.74 | 1.53 | 0.86 | 0.57 | 38.8 | 12.2 |
| Example 7-1 | 499 | 3 | 16 | 100/30 | 3.30 | 1.87 | 1.06 | 0.72 | 15.8 | 4.9 |
| Example 7-2 | 190 | 3 | 16 | 100/30 | 3.32 | 1.89 | 1.06 | 0.74 | 15.8 | 4.7 |
| Example 7-3 | 100 | 3 | 16 | 100/30 | 3.31 | 1.89 | 1.07 | 0.73 | 16.0 | 4.7 |
| Example 7-4 | 10 | 3 | 16 | 100/30 | 3.32 | 1.91 | 1.08 | 0.74 | 15.9 | 4.6 |
| Example 7-5 | 2 | 3 | 16 | 100/30 | 3.32 | 1.90 | 1.08 | 0.75 | 15.8 | 4.5 |

The results of Tables 1 to 7 indicated that Examples 1 to 7, in which the Fe content was in the range of 2 to 499 mass ppm, showed high capacitance as compared to Comparative Examples 1 to 7, indicating suppressed equivalent series resistance (ESR).

The porosity of the electrode material after sintering and before anodization in Example 1 and Comparative Example 1 was measured. The porosity was measured by the following method.

Measurement of Porosity

A sample of 15 cm×5.5 cm was cut out from the electrode material and the substrate used, and calculation was performed according to the following formula.

Porosity (%)={1−[mass of electrode material(g)−mass of substrate(g)]/[[thickness of electrode material(cm)×sample area(cm²)×specific gravity of aluminum(2.70 g/cm³)]−mass of substrate(g)]}×100

In the above formula, the thickness of the electrode material is an average value obtained by measuring a total of five points including the four corners and the central portion of the cut sample with a micrometer.

The results are shown in Table 8.

TABLE 8

| | Fe content of powder (mass ppm) | Porosity (%) |
|---|---|---|
| Comparative Example 1-1 | 750 | 39.1 |
| Comparative Example 1-2 | 500 | 39.7 |
| Example 1-1 | 499 | 46.6 |

TABLE 8-continued

| | Fe content of powder (mass ppm) | Porosity (%) |
|---|---|---|
| Example 1-2 | 190 | 46.5 |
| Example 1-3 | 100 | 46.6 |
| Example 1-4 | 10 | 46.5 |
| Example 1-5 | 2 | 46.6 |

The results of Table 8 indicated that in Examples 1-1 to 1-5, in which the Fe content was in the range of 2 to 499 mass ppm, a porosity of 46% or more was maintained while in Comparative Examples 1-1 and 1-2, in which the Fe content was 500 mass ppm or more, the porosity was 40% or less. The above confirmed that since the electrode material of Example 1 had a larger surface area than that of the electrode material of Comparative Example 1, it exhibited a capacitance required for capacitors.

Back Surface Observation

Using the anodized electrode materials produced in Comparative Example 1-2, Example 1-1, and Example 1-5, the back surface was observed by the following method. The anodization of the electrode material used for the back surface observation was performed under the condition of 550 V.

The metallic aluminum portion (aluminum foil and aluminum alloy powder) of the anodized electrode material was dissolved in a Br-methanol solution and removed. Subsequently, only a chemical conversion film (sintered body) was collected, washed with water and dried, and then observed from the side where the substrate was present by using an electron microscope (SEM).

17

Figure 2:
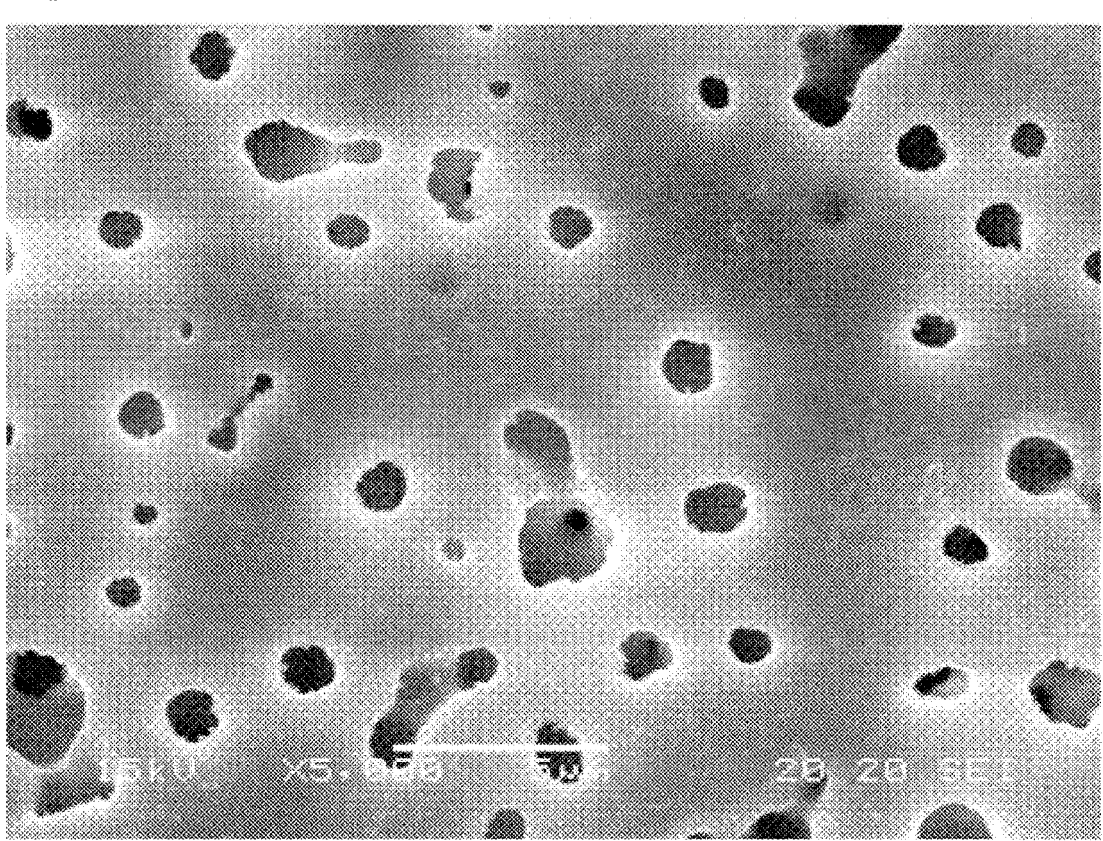
FIG. 2 is an image obtained by observing the back surface of the electrode material produced in Example 1-1 and photographing the back surface with a scanning electron microscope (SEM).
Figure 3:
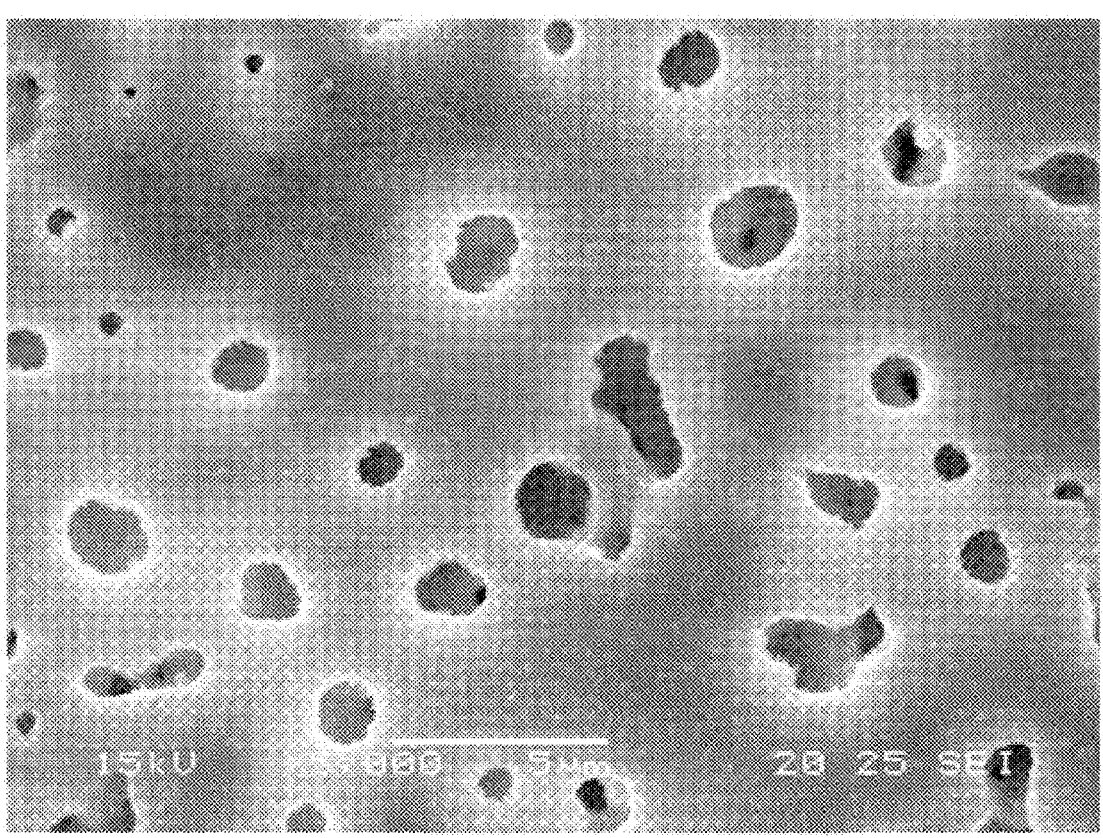
FIG. 3 is an image obtained by observing the back surface of the electrode material produced in Example 1-5 and photographing the back surface with a scanning electron microscope (SEM).

FIG. 1 shows an SEM photograph of the back surface observation results of Comparative Example 1-2, FIG. 2 shows an SEM photograph of the back surface observation results of Example 1-1, and FIG. 3 shows an SEM photograph of the back surface observation results of Example 1-5. The SEM photographs shown in FIGS. 1 to 3 are SEM photographs of the chemical conversion films, wherein the void portion corresponds to a portion where metallic aluminum (aluminum alloy powder) was present. It was found from FIG. 1 that the observation surface was not flat in Comparative Example 1-1, indicating that the aluminum alloy powder and the substrate were excessively sintered. Additionally, it was found from FIGS. 2 and 3 that the observation surface was flat in Example 1-1 and Example 1-5, indicating that sintering of the aluminum alloy powder and the substrate was appropriately controlled.

The invention claimed is:

1. An electrode material for aluminum electrolytic capacitors, comprising a sintered body of an aluminum alloy powder on at least one surface of a substrate, wherein the substrate is an aluminum foil substrate or an aluminum alloy foil substrate, the aluminum alloy powder contains Fe in an amount of 100 to 499 mass ppm, and a porosity of the electrode material is 46% or more.

2. The electrode material for aluminum electrolytic capacitors according to claim 1, wherein the aluminum alloy powder contains Fe in an amount of 100 to 400 mass ppm, and the remainder comprises Al and an unavoidable impurity.

3. The electrode material for aluminum electrolytic capacitors according to claim 1, wherein the aluminum alloy powder has an average particle diameter $D_{50}$ of 1.5 μm or more and 15 μm or less.

4. The electrode material for aluminum electrolytic capacitors according to claim 1, wherein the substrate is an aluminum foil substrate having an Al purity of 99.99 mass % or more, and has a thickness of 10 μm or more and 80 μm or less.

5. The electrode material for aluminum electrolytic capacitors according to claim 1, wherein the sintered body is formed on both surfaces of the substrate, and has a total thickness of 50 μm or more and 2000 μm or less.

6. A method for producing an electrode material for aluminum electrolytic capacitors, comprising (1) step 1 of forming a film of a paste composition containing an aluminum alloy powder on at least one surface of a substrate, and (2) step 2 of sintering the film at a temperature of 560° C. or more and 660° C. or less, wherein the substrate is an aluminum foil substrate or an aluminum alloy foil substrate, the aluminum alloy powder contains Fe in an amount of 100 to 499 mass ppm, and a porosity of the electrode material is 46% or more.

7. The production method according to claim 6, wherein the aluminum alloy powder has an average particle diameter $D_{50}$ of 1.5 μm or more and 15 μm or less.

8. The production method according to claim 6, further comprising an anodization step after step 2, wherein the voltage in the anodization step is 250 V or more and 800 V or less.

* * * * *